United States Patent [19]

Bradley et al.

[11] Patent Number: 4,736,377
[45] Date of Patent: Apr. 5, 1988

[54] METHOD FOR DETERMINING RELIABILITY OF HIGH SPEED DIGITAL TRANSMISSION BY USE OF A SYNCHRONIZED LOW SPEED SIDE CHANNEL

[75] Inventors: Frank Bradley, Cliffside Park, N.J.; Royce Fletcher, Santa Cruz, Calif.

[73] Assignee: Bradley Telcom Corp., Leonia, N.J.

[21] Appl. No.: 828,184

[22] Filed: Feb. 11, 1986

[51] Int. Cl.$^4$ .............................................. G06F 11/10
[52] U.S. Cl. ....................................... 371/37; 371/40; 371/42
[58] Field of Search ............... 371/37, 38, 39, 40, 371/45, 43, 44, 46; 375/114, 116, 108, 106, 94, 26

[56] References Cited

U.S. PATENT DOCUMENTS

| | | | |
|---|---|---|---|
| 4,271,520 | 6/1981 | Coombes | 371/47 |
| 4,312,070 | 1/1982 | Coombes | 371/45 |
| 4,539,684 | 9/1985 | Kloker | 371/45 |
| 4,613,860 | 9/1986 | Currie | 371/37 |

*Primary Examiner*—Michael R. Fleming
*Attorney, Agent, or Firm*—Gottlieb, Rackman & Reisman

[57] ABSTRACT

The reliability of a high-speed digital data traffic channel is determined by establishing end-to-end synchronization by use of confirming error detecting data transmitted on a side channel from an originating end, comparing the traffic data and the error detecting data and from time to time re-confirming the validity of the synchronization.

20 Claims, 11 Drawing Sheets

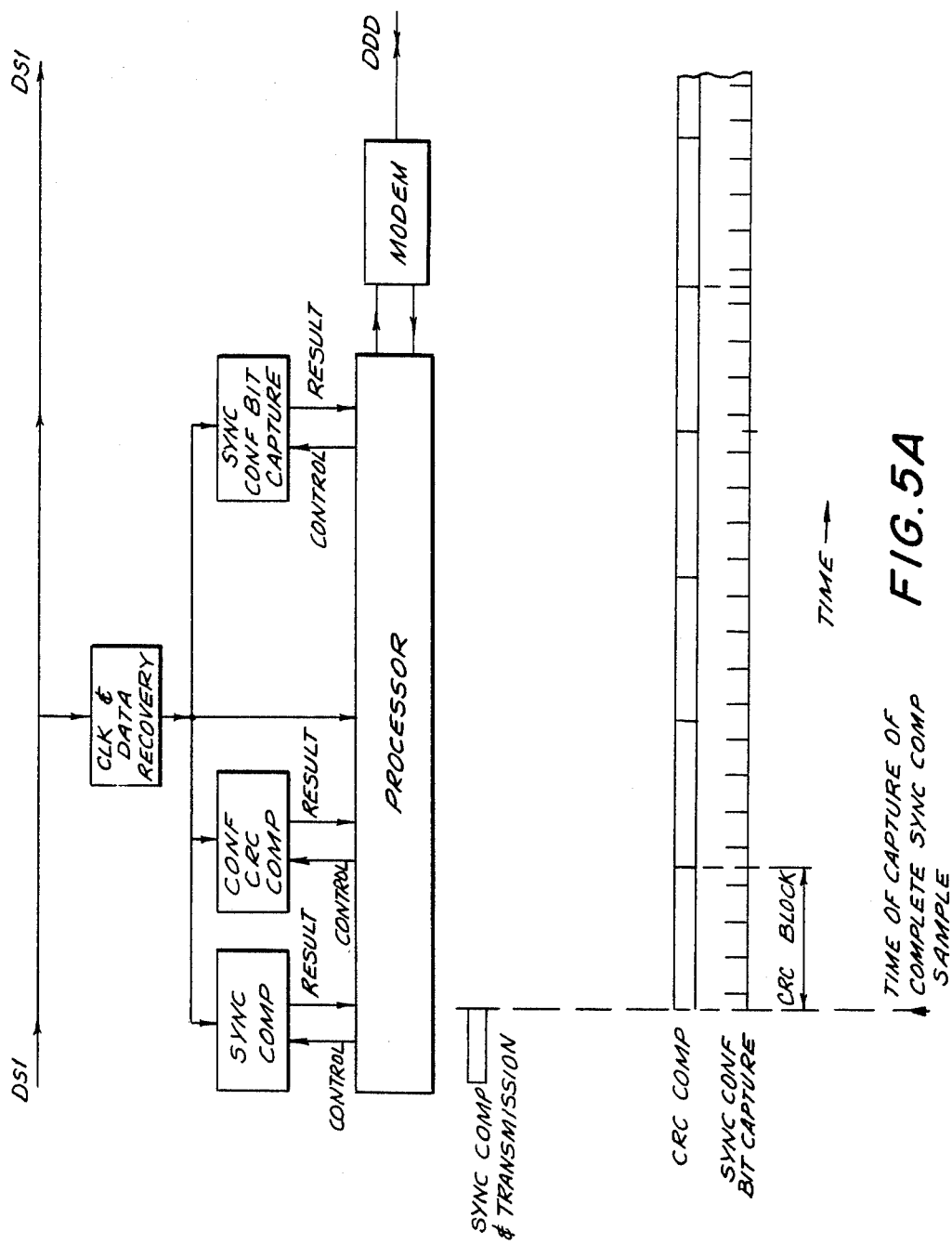

THREE BIT COMPARE BLOCK

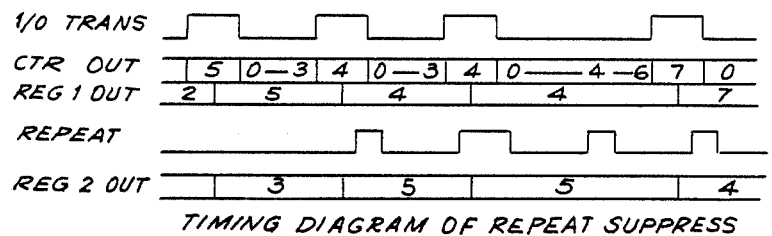
TIMING DIAGRAM OF REPEAT SUPPRESS
FIG. 11
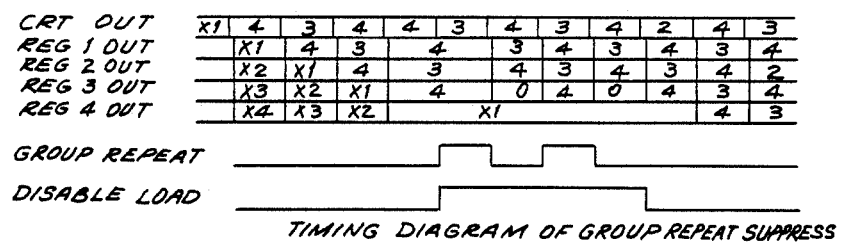
TIMING DIAGRAM OF GROUP REPEAT SUPPRESS
FIG. 12
FIG. 13
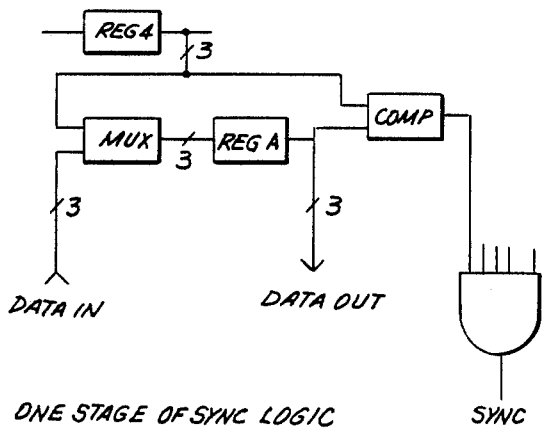
ONE STAGE OF SYNC LOGIC

METHOD FOR DETERMINING RELIABILITY OF HIGH SPEED DIGITAL TRANSMISSION BY USE OF A SYNCHRONIZED LOW SPEED SIDE CHANNEL

BACKGROUND OF THE INVENTION

1. Field of the Invention

This invention relates to error detection in long distance digital data transmission lines during live traffic transmission and more specifically to apparatus and methods for providing channel performance testing without knowledge of the channel contents.

2. Description of Related Art

Digital telephony was introduced originally as a carrier for voice communications. Its purpose was to expand the capacity of transmission lines. Non-voice digital data transmission proliferated with the growth of data processing application of voice frequency (VF) analog equipment, including pulse code modulation (PCM) facilities. Direct digital customer data links have been prominent since the introduction of the Digital Data Service (DDS) in the early 1970s. DDS offers a maximum rate of 56 KB/sec. To accommodate higher traffic rates a full T1 channel (1.544 Megabits per second in the USA) is being offered by many carriers.

Various restrictions have been placed on the data introduced into these channels. They were leased originally subject only to a minimum "ones density" requirement and a maximum number of succesive zeros permissible in the data stream so that clock recovery circuits along the route would be refreshed before the recovered clock, which is the basis of digital data regeneration, had decayed or had drifted too far from nominal frequency. This proved to be unsatisfactory because, in the absence of any specified framing format for data, the carriers are unable to frame on the multiplicity of data formats used by various vendors and are thus unable prior to the present invention to verify customer complaints about channel errors. Recently certain carriers have attempted to solve this problem by adding a further format requirement to new service offerings. In particular a requirement of "D4" format has been specified. This means that every 193rd bit is required to be devoted to an overhead function, framing. Bell System Technical Journal dated November 1982 describes such D4 framing. Not only does this have the undesirable results of restricting the data rate and interfering with the functioning of much of the existing hardware, i.e., the equipment designed and installed by the industry to use the entire T1 channel, but it also places an undesireable restriction on encrypted data by providing an interceptor with someplace to start.

Also in the last few years a great deal of effort has been expended to permit channel performance monitoring during live traffic transmission. See AT&T Compatibility Bulletin 142, "The Extended Framing Format Interface Specification". The Extended SuperFrame (ESF) technique has been widely promoted by the Bell System and others. The ESF format provides a limited cyclic redundancy code check (6 bit) on live traffic. It also provides a 4 Kilobit per second supervisory or maintenance channel. A great deal of hardware is being developed for ESF, some of it is now starting to be deployed.

SUMMARY OF THE INVENTION

It is a purpose of this invention to provide capability of checking the performance of a digital transmission channel, such as a T1 channel, without regard to the presence or absence of framing format. Also of interest are other digital data channels at rates below T1, such as DS0 and at rates above DS1. DS1 refers to the line format for a T1 line and is used herein interchangeably to designate a T1 line. Generally, DS1 specifies nominal 1.544 MHz data rate, less than 15 consecutive zeros, a required pulse shape and amplitude, and polarity limitations.

It is a purpose of this invention to provide the aforesaid channel performance checking without affecting the channel contents in any way.

It is a purpose of this invention to provide channel performance checking of encrypted channels with no knowledge whatsoever of the channel contents and without comprising the data security.

It is a further purpose of this invention to provide a method for synchronizing with high certainty on random information in a T1 channel, using an amount of information which is much less than the amount of data being transmitted on the channel, and to handle such synchronization on a low-speed side channel.

Other purposes of the invention will be clear from the following disclosure.

BRIEF DESCRIPTION OF THE DRAWINGS

FIG. 5A is a block diagram of the side monitoring transmission and timing.

FIG. 11 shows the timing of signals associated with the suppression of repeating 1/0 transition distance measurements.

FIG. 12 shows the timing of signals associated with suppression of repeating pairs of 1/0 transition distance measurements.

FIG. 13 is a logic diagram for the capture of a three-bit distance measurement and for the comparison of sync samples.

DETAILED DESCRIPTION OF A PREFERRED EMBODIMENT

The present invention provides a means of monitoring and reporting end-to-end data transmission reliability performance of digital data channels such as DS1 lines which are carrying information of arbitrary content and specifically of channels which are not required to conform to any particular framing or synchronization pattern. This is accomplished by using a parallel low speed channel. The low speed channel may be VF or digital and private line or Direct Distance Dialing (DDD) channel. This low speed channel is used first to establish end-to-end synchronization. After synchronization has been established, checking data, e.g., cyclic redundancy check (CRC) data, is calculated for the high speed channel and transmitted from the originating end via a low speed side channel for comparison with CRC data calculated at the high speed channel receive end. If, as in ESF, a CRC6 polynomial is used at least 63/64 of all errors are captured.

An error detection and correction scheme is used in the transmission of CRC data so that errors introduced by the low speed channel will not be attributed to the high speed channel under test.

Embodiments of the hardware carrying out the processes of the present invention are hereinafter referred to as Line Monitors. One Line Monitor is placed at each end of the monitored high speed communication channel and the two Line Monitors are linked by a low speed communication channel. This arrangement is sufficient to provide monitoring of error performance and reporting—via front panel displays and/or attached printer—of the resulting error performance. Reporting on errors for both directions of DS1 transmission is available at either end.

For example, either or both of the Line Monitors can be coupled via a low speed communication channel to a Maintenance Control Unit (MCU) which can be an operator interface based on a PC type computer.

A preferred embodiment of the invention is directed toward North American DS1. The invention is, however, applicable to other data services such as Bell System DDS, switched 56 Kb/sec digital service, to CCITT services at the same hierarchy levels (DS0 and DS1) and to higher speed services. The low speed test link may be DDD or other lower rate services such as DDS or a two-wire or 4-wire private line. Also included within the scope of this invention is the use of high speed lines, e.g. switched 56 kb/sec facilities as the low speed DDD channel.

Figure 1:
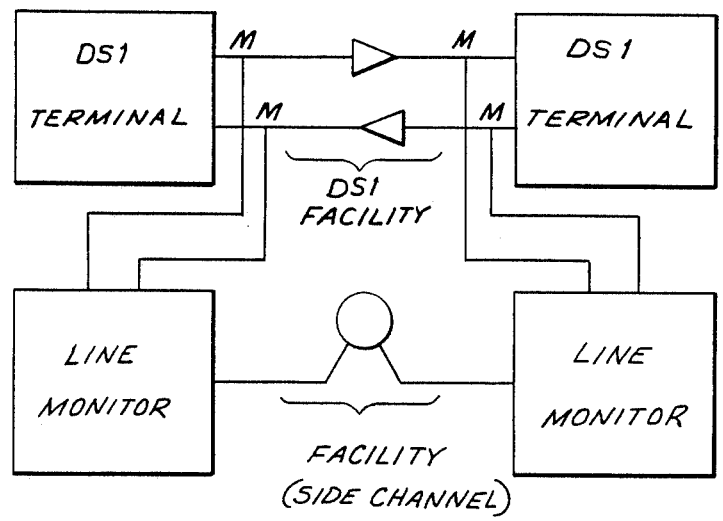
FIG. 1 is a schematic representation of the configuration of a test system of the present invention in place on a T1 line.

The overall configuration of a test system is shown in FIG. 1. A Line Monitor connects to each direction of transmission of the DS1 facility at telephone company locations such as the DSX-1 cross connect monitor jacks (not shown) or at the customer location, or any other convenient DS1 access point. Each Line Monitor also connects to a DDD facility which is used to provide a full duplex "side channel" over which the line monitor units exchange information. Illustratively the DDD facility may contain a single satellite hop. The DS1 facility can also may contain a satellite hop. This fact about the DS1 facility may or may not be known in advance of the operation of the test system and can be the subject of an operator input, e.g., setting a switch position or the like.

Initial Synchronization

The preferred embodiment has means of achieving initial synchronization of the two line monitor test units with respect to the DS1 data stream.

For each direction of transmission of the DS1 signal the two Line Monitor units are adapted to find a common point of synchronization for the computation source end CRC data, as transmitted via the DDD, and the CRC data as locally generated from the DS1 data stream. Once such a common point of synchronization is found, CRC computations are performed to confirm the validity of the synchronization and to perform continuous CRC-based (or other) reliability tests on the data stream. Also once such a common point of synchronization is found selected bit positions in each data block are monitored at both ends and, with end-to-end transmission and suitable delays, compared with each other as continuous sync confirmation bit samples.

Initial synchronization and reliability tests are performed in a similar fashion for each of the two directions of transmission of the DS1 facility. All further discussions deal with only one of the transmission directions with the understanding that all operations must be duplicated for the opposite direction of DS1 transmission.

In order to achieve initial synchronization, the line monitor at the "transmitting" end of the DS1 facility scans the passing DS1 data and, using a sampling strategy to be described below, identifies a point in time in the DS1 data stream. It then passes its identifying information to the "receiving" end of the DS1 facility. The unit at the "receiving" end also identifies the corresponding point in the DS1 data stream after the DS1 signal has undergone a somewhat unpredictable propogation delay, and after the low speed side channel transmission of the identifying information has undergone a somewhat unpredictable propagation delay.

Synchronization Logic

Figure 2:
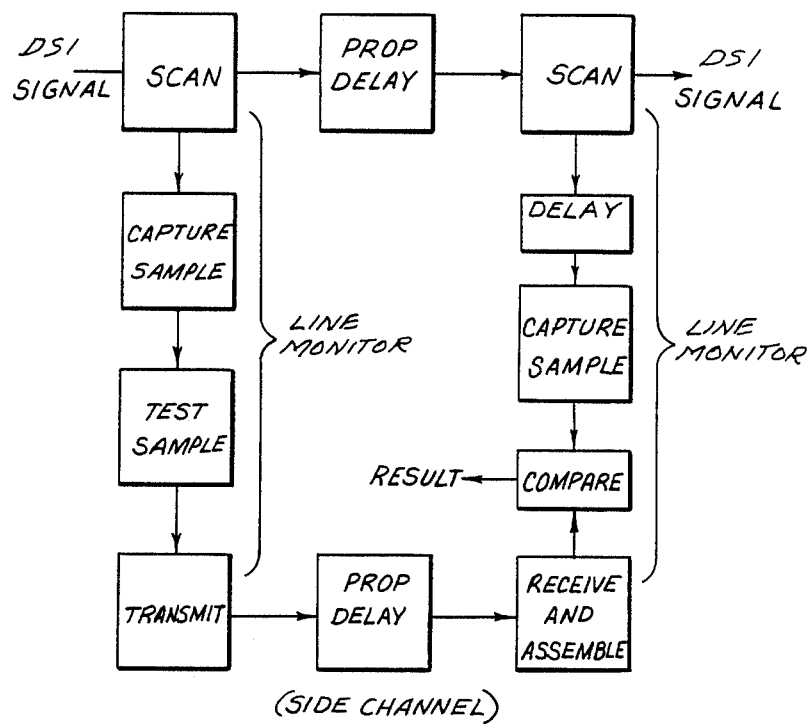
FIG. 2 is a schematic representation of the synchronization logic for one direction of DS1 transmission.

FIG. 2 shows the initial synchronization function of one direction of DS1 transmission. The unit at the left or "transmitting" end of the DS1 system scans the DS1 data stream, develops its identifying information (capture sample) and optionaly tests the information for its "power" as identifying information. It then sends the information over the side channel to the receiving end. The right hand or receiving end unit scans the received DS1 signal, perhaps delays an image of the DS1 signal (for example, in an elastic store), performs a similar identifying test and compares its identifying information with the identifying information received from the "transmitting" end. If the two sets of identifying information match, then the receiving end assumes that it has achieved initial synchronization. A subsequent "confirmation" CRC check confirms (or not) that the synchronization is correct. If synchronization is incorrect the confirmation will fail. In this case the system will automatically reinitiate a synchronization attempt. In the case of a loss of sync after confirmation the system will also automatically initiate synchronization attempts.

DDD and DS1 Signal Paths

Figure 3:
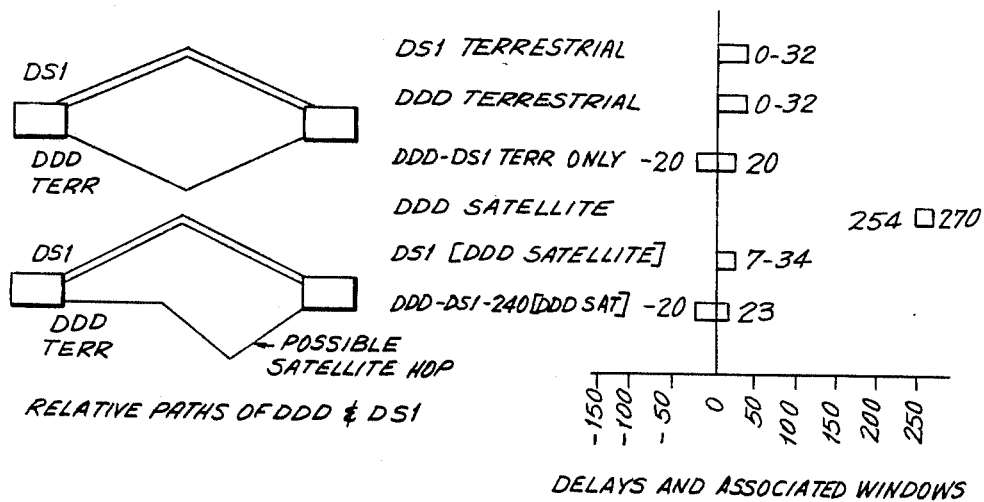
FIG. 3 is a diagram of the possible DDD and DS1 signal paths of data for use with the test system of the present invention.

FIG. 3 is a diagram of several possible DDD and DS1 signal paths which the invention is capable of handling. It is possible to handle these and Extraterrestrial DS1 by switch selection on the front panel of a Line Monitor in a manner to be explained below.

Relative Delay

In order to achieve synchronization and then perform reliability tests on the DS1 data stream the invention insures that the side channel information from the transmitting end arrives at the receiving end by the time the capture sample is calculated from the DS1 signal at the receiving end and is presented for comparison at the receiving end with information from the side channel. The DS1 signal at the receiving end is delayed by some amount (D3 in FIG. 2) to accomplish this.

A preferred method for delaying the DS1 signal without loss of information content is by writing its bits into a memory and then reading them out at a later point in time using a "ring buffer" approach. A single 64K×1 chip and its associated presettable address counters can delay the DS1 signal by up to 42.44 msec. 256K×1 chips are available which would yield a 169.78 msec. delay per chip).

Synchronization Window

The invention accomodates both predictable and unpredictable delays in both the DS1 signal path and the side channel path. It compensates for predictable delays by proper offset of D3 as discussed above.

Of more concern are the unpredictable delays or more precisely, the unpredictable delays of the DS1 signal with respect to the side channel.

To handle unpredictable delays the receiving end DS1 signal is scanned over a time interval at least as long as the uncertainty in relative delays in order to locate the point of synchronization. The time interval over which the receiving end DS1 signal must be scanned will be called the "synchronization window" or simply the window. The window is preferably small to minimize the posssibility of synchronization sample signals repeating in the window but it must be large enough to accomodate the maximum unpredictable differential delay between the side channel and the main channel.

Size of Synchronization Window

The size of the synchronization window is simply the amount of uncertainty in the time of arrival at the receiving end of the side channel information with respect to the time of arrival at the receiving end of the DS1 signal.

Uncertainty of the relative delays arises from two sources. One source of uncertainty is the difference in path length of the side channel with respect to the path length of the DS1 signal. Another source of uncertainty is the variation which can exist from circuit to circuit in the propagation delay of circuits of the same path length.

Figure 4:
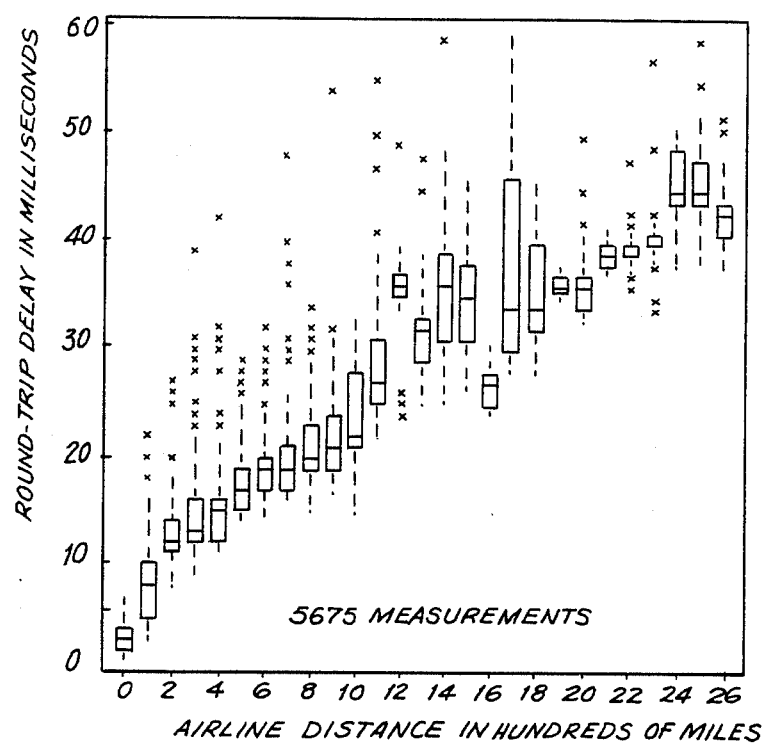
FIG. 4 is a graphic representation of delay times through the DDD network.
Figure 4:
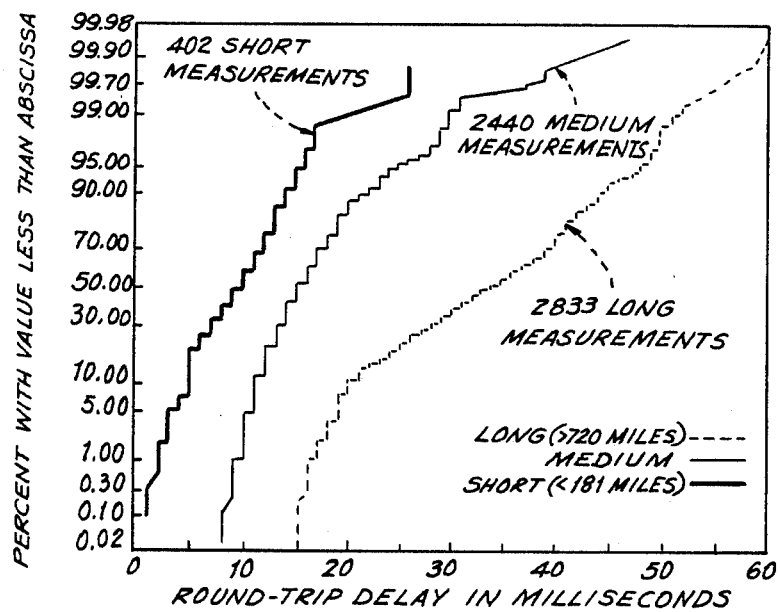

The AT&T End Office Connection Study (Bell System Technical Journal, November 1984) indicates the magnitude of the synchronization window that is relied upon in a preferred embodiment of the present invention. FIG. 4 is from that study and shows that the difference between the delay for a "best case" zero length VF circuit and the delay for a "worst case" cross country circuit is of the order of 30 msec. each way (60 msec. round trip). A satellite hop in the side channel could add another 270 msec. each way.

DS1 circuits are expected to exhibit similar delay vs. distance variations although the deviation from nominal could be expected to be less. Total relative delay variations between the side channel which includes a satellite hop and the DS1 circuit could run to 330 msec. in a completely worst case situation, the synchronization window would be 330 msec.

In using the present invention the Line Monitor measures the side channel delay, and the operator calibrates out (with an additional fixed delay where necessary) the presence or absence of a satellite delay in the DS1 path. This technique reduces the total of unpredicted delay to +/−15 msec. rather than the +/−165 msec. of total possible differential delay. The possibility of multiple identical samples within the synchronizing window increases linearly with the unpredictable delay. Therefore the present invention gains a factor of 11 in ease of achieving initial synchronization by having the test instrument measure the delay present in the side channel path and by setting specifications to rule out proper operation for certain highly unlikely combinations of path length and circuit delay variations.

Setting the specifications in this manner may in some small number of cases allow the test system to be set up, the side channel circuit to be established and the system fail to achieve synchronization due to the window being too small. In that event, the operator then re-establishes the side channel link until a circuit is found which has more favorable delay variation characteristics. In the preferred embodiment a 50 msec. window is used. Extensive testing over a variety of test locations did not require a single instance of redial because of excess propogation delay variation.

Side Channel Data Rate (Synchronization Detection)

The present invention is capable of initial synchronization even when there is a relatively low side channel data rate with respect to the DS1 signal. This lower data rate arises as follows.

At 1200 baud the side channel can transmit at most one bit per 1286 DS1 bits. If the side channel is asynchronous there is one start bit and one stop bit per byte of side channel data. This yields an efficiency of 80%. If parity checking or other forms of integrity checking are employed, the efficiency goes down even further. In the preferred embodiment, if an error checking and correction (ECC) technique is used, the efficiency is reduced by a factor of 16/22 due to that alone and with asynchronous transmission has a 57% total efficiency or 2210 DS1 bits per side channel bit).

The present invention is capable of operating with a low data rate in the side channel relative to the DS1 signal because during synchronization the side channel data transmission is only concerned with transmitting enough of a sample of the DS1 data to establish and confirm synchronization. The time duration of this sample on the side channel can be longer than the time duration of the DS1 data from which the sample was generated. The extra time needed is "created" by delaying the DS1 sample at the receive end by the necessary additional amount before the comparisons are carried out.

Side Channel Data Rate

The present invention provides for error tolerant maintenance of synchronization once established as follows. Once synchronization has been satisfactorily established the hardware must monitor and check all of the data for errors. The side channel must transmit all of the data associated with CRC, system control, error reporting, and DDD error detection and correction for each CRC block checked in the same amount of time (or less) than the time which that CRC block occupies at DS1 data rate. In a preferred embodiment further described below there are 16 data bits and 6 ECC bits per CRC block. This information is transmitted asynchronously as three 8 bit bytes. Associated with each byte are a start bit and a stop bit. This is a total of 30 bits. At a data rate of 1200 B/sec this results in elapsed time for transmission of 25 msec. A time margin is required due to timing inconsistency between the asynchronous DDD channel and the synchronous DS1 channel. For safety's sake and for purposes of the "confirmation" CRC check described below an interval of approximately 33 msec. is preferred. During this interval approximately 51,000 data bits are transmitted at DS1 level. This therefore is the size of the CRC block.

Loss Of Sync Detection

In a discussion below under CRC Sync Confirmation there is a tabulation showing the effect of a $10^{-4}$ bit error rate on CRC block errors. In summary there is very little chance of obtaining error-free blocks of the above size at such an error rate. There is virtually no chance at all of obtaining error-free blocks at a $10^{-3}$ error rate. It is desireable to maintain synchronization at even lower error rates such as $10^{-2}$. Any loss of sync check which depends upon CRC errors will not handle such error rates since it would declare itself out of sync (because of continuous CRC errors) while the end to end synchronization is still good. This is objectionable because of the time lost during unnecessary resynchronization.

This problem is circumvented during the operation of the present invention by monitoring and transmitting a few selected bits from the DS1 data stream within the CRC block after initial synchronization has been achieved and confirmed. These are preferably evenly spaced rather than bunched together to avoid sensitivity of the "loss of sync" detection scheme to "bursty" errors. At the receive end the equivalent bits are picked out of the data stream and compared with the DDD transmitted bits. If, for example, four bits are so selected and "out of sync" is declared when 2 or more are errored, an error-tolerant sync status monitoring results. Depending upon the data characteristics this may or may not be a sufficiently strong criterion to confirm initial synchronization. In a preferred embodiment an intermediate sync confirmation stage is included using shorter CRC blocks as described below under Synchronization Strategy 2.

Random Patterns

The initial synchronization strategy of the present invention is designed to be successful with virtually any pattern of data that is not completely repetitive. The data format on the line is only restricted by the minimum ones density and maximum successive zeros restrictions of the DS1 format specification. Random data is discussed below.

The statistics of random data patterns can be calculated from probability theory. For example, the probability that an arbitrary 16 bit pattern will occur exactly r times in 30,880 consecutive random data bits (20 msec. worth of data) is:

| r | Prob of r Occurrences | Prob of $<=$ r Occurrences |
|---|---|---|
| 0 | 0.6244 | 0.6244 |
| 1 | 0.2941 | 0.9185 |
| 2 | 0.0692 | 0.9877 |
| 3 | 0.0109 | 0.9986 |
| 4 | 0.0013 | 0.9999 |

Thus, any particular 16 bit pattern would almost never appear more than 4 times and 92% of the time the pattern would appear either once or not at all.

If one could depend on having truly random data on the DS1 facility then a workable initial synchronization strategy would be to capture 16 successive bits from the transmitting end DS1 signal, send those 16 bits via the side channel to the receiving end and then scan a delayed image of the DS1 signal at the receiving end until the same 16 bits were found. Statistically, the synchronization point found in that fashion would be correct 92% of the time and little time would be wasted attempting to confirm an incorrect choice of synchronization time.

Voice frequency signals contain complex combinations of fairly low frequency components. These signals, when processed by the codec can be expected to produce channel data with a high degree of nearly random variability. As a result, voice channels present in the DS1 data stream should improve the efficiency of sync capture.

Similarly, modem channels which are carrying active data and thus have either phase shift modulation or frequency shift modulation will increase the "randomness" of the modem channel data and will improve the efficiency of sync capture.

Periodic Data Patterns

Although the data pattern on the DS1 facility is unknown, it is not necessarily random and in fact can frequently be expected to be very non-random.

Consider, for example, a DS1 facility carrying a D4-framed signal. Much of the time a D4 channel bank can be lightly loaded or unloaded. When a D4 channel is unequipped, or operating nearly quiescent, it transmits a signal near all ones. If three successive channel slots are idle, the 16 bit sample synchronization strategy described above is greatly degraded because the chances are that the 16 bit sample will contain one or more bytes of "all ones" idle code. Since the idle code occurs frequently in the DS1 bit stream, we can only count on the portion of the sample which is not idle code to distinguish the sample from some other 16 bit sample. To the extent that the 16 bit sample contains idle code its usefulness as synchronization information is reduced.

X.25 data channels contain all ones when idle, repeated flag (01111110) preambles, data packets, ending flags and return to the all ones idle condition. The data packet contains an address byte followed by a control byte followed by an arbitrary number of information bytes and terminated by two bytes of CRC check data. Note these are X.25 CRC check bits and not the CRC check bits associated with the invention.

Value of Testing Sync Data at Transmit End

Data patterns with multiple "nearly cyclical" patterns within the window can lead to a low probability of synchronization per attempt. As a further refinement in a preferred embodiment of the present invention, in some applications it is desireable to test the sync data at the transmitting end to eliminate, where possible, sync data patterns which occur repeatedly within the window.

For example, a sync data pattern is captured and then compared over a window interval to continuously generated sync data patterns. The number of times that the pattern repeats is recorded along with the data pattern itself. If the pattern occurs only once it is sent to the receiving end for use in capturing sync. If, after some large number of attempts (say 50) no singly occurring pattern is found the pattern with the fewest repetitions is selected and tested for an additional window interval. If the pattern is found to occur at least once in the window, it is sent to the receiving end for use in capturing sync. The final confirmation of sync is, in any event, a result of the Confirmation CRC checks.

The additional testing can be done with no need to increase the fixed delay of the DS1 signal at the receiving end. One the sync data pattern is computed at the transmitting end, the unit commences sending the pattern over the side channel. If the pattern is found to repeat, the transmission is terminated and the termination flagged. As soon as the side channel becomes available the next sync data pattern is captured and the process repeated.

SYNCHRONIZATION

The preferred embodiment of the present invention is capable of being implemented with any synchronization strategy in line with the considerations enumerated above. Particular examples of such strategies will now be given.

SYNCHRONIZATION STRATEGY 1

One synchronization strategy that is preferred is the following: define a 9 bit data block, assign six of these to CRC checking, 2 to control and 1 to a message channel. These numbers are preferred but are not critical. Other block sizes and bit allocations will be apparent to persons skilled in this art. For asynchronous communication with an Error Correcting Code assume an efficiency of 57%, i.e., send 16 bits to transfer 9 bits of information. The synchronization scheme then sends a long image sample, perhaps 100 or more sequential bits from the transmit end DS1 data stream via the DDD link, 9 bits at a time, and assembles the "capture sample" for comparison at the receive end. The received DS1 is delayed enough so that the DDD transmitted image arrives and is assembled at the receive site before the DS1 signal which is the source of the image arrives. The side-channel-transmitted image is compared with the received signal and upon match sync confirmation testing is begun.

For a 16 bit data block as above the relationship between Side Channel data rate required to support CRC6 a minimum block length both in bits and in milliseconds for a DS1 data stream is tabulated below. Due to timing variations in the asynchronous data slightly longer blocks will be required. Examination of this table permits decisions to be made regarding the CRC sample block size versus the DDD data rate required for support of the block size.

| DATA RATE (BPS) | BLOCK LENGTH (BITS) | BLOCK LENGTH (MSEC) |
|---|---|---|
| 1200 | 20587 | 13.33 |
| 2400 | 10294 | 6.67 |
| 4800 | 5147 | 3.33 |
| 9600 | 2574 | 1.67 |
| 14400 | 1716 | 1.11 |

The two control bits indicate one of four operating model, that the 6 bit data is Transmission Delay Monitoring Signal, Synchronizing Data, CRC Data, or Resync Request. The first signal above travels round trip on the DDD facility. The $2^{nd}$ and $3^{rd}$ signals are in the direction from the transmit to the receive end (referrring to the DS1 channel). The Resync Request is in the direction from the receive end to the transmit end. It is a signal to the transmit end to reinitiate the synchronizing process and is sent:
1. When the receive unit has scanned through its window without finding a match:
2. When a receive unit which has declared sync capture has excessive CRC or sync confirmation bit errors;
3. When a unit which was synchronized drops out of sync.

At the initiation of the Sync command an "N" bit Synchronizing Data sample is sent. Immediately thereafter the transmit end initiates a series of CRC6 calculations. These are stored and, when the first CRC6 data block is assembled, the control state is changed to CRC Data and the CRC results are sent.

At the receive end the DS1 data is delayed by the Preset Delay and thereafter assembled in a parallel output register. It is shifted once per T1 clock until the synchronizing sample, as received via the DDD matches the data stream for the entire synchronizing sample. At this instant synchronization is declared and a CRC6 calculation is initiated on the DS1 data at the receive end. The data at both ends is divided into identical blocks (relative to the end of the synchronizing sample). A CRC6 calculation is carried out for each block at the transmit end and is transmitted via the DDD link. The timing of the information sent, including CRC data, error control data, and status control data, is such that the complete information package for block N is sent within the time of block N+1. The CRC calculation for equivalent blocks at the transmit and the receive end is compared at the receive end on a block by block basis and any difference is reported as a CRC error.

If no match occurs between the side channel transmitted synchronizing sample and the locally recovered DS1 data within the synchronizing window, the transmit end is informed via the data link and the process is repeated.

Once sync has been detected confirmation is carried out by either or both sampling sync confirmation bits at discrete locations in the CRC block or based on the CRC calculation. The sync confirmation bits are transmitted via the DDD path and, at the receive end, they are compared with the same bit positions in the DS1 received data. If more than a specified number of the sync confirmation bits are in error "Out of Sync" is declared and the synchronization process starts again. If the DS1 data has a high "Idle" content this may not be a strong enough criterion for sync confirmation. n that case, if the block length is short enough so that the CRC error rate is not excessive at the DS1 data stream error rate at which the system is required to synchronize, CRC can be used for sync confirmation. If the CRC block is too long for this purpose refer to the sync confirmation strategy under Synchronization Strategy 2, below. Once synchronization is confirmed it is normally preferable to continue operation through error rates higher than the "zero" error rare required for "sync capture" and the intermediate error rate permissible furing "sync confirmation." If the CRD block length is too long to permit this, i.e., if at the highest permissible (short term) operating error rate the discrimination realizable by monitoring CRC error is inadequate, then the strategy of monitoring selected data stream bits described previously under Capital Loss Of Sync Detection is implemented.

After synchronization CRC errors are accumulated and reported locally and the instantaneous fact of their occurence is returned to the transmit end via the message channel bit of the message traveling in the opposite direction on the DDD channel.

Note that in the table above that if a nominally 5200 bit ARC block is selected and a 4800 B/Sec modem used, the CRC block is close in size to the 4632 bit block of the industry standard Extended Super Frame CRC6 computation block so that error analysis with the invention provides results statistically similar to ESF. In the case of ESF a $10^{-3}$ error rate results in approximately 320 CRC errored blocs out of the 333 blocks which occur in one second.

Functional Description, Sync Strategy 1

Figure 5B:
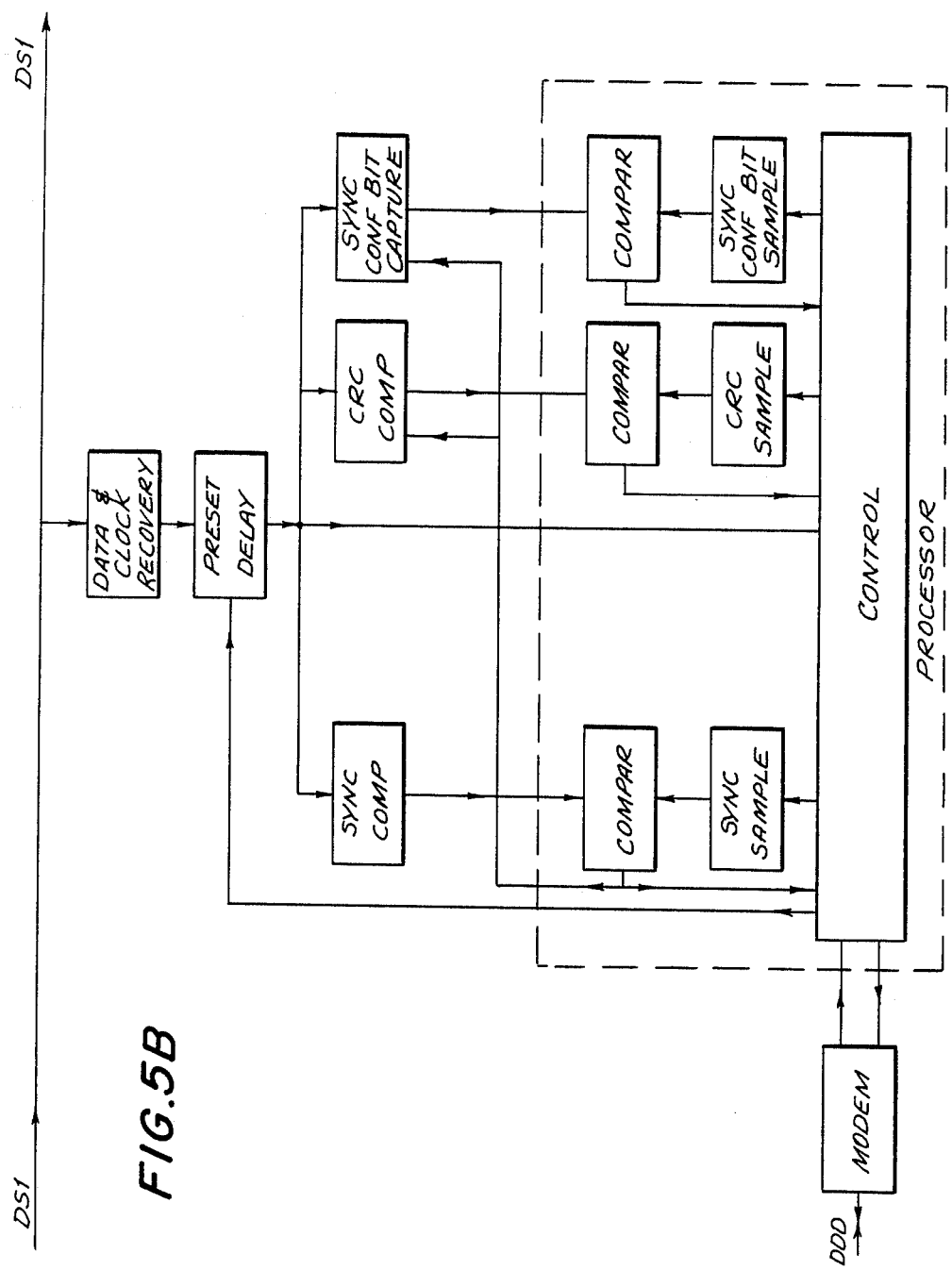
FIG. 5B is a block diagram of the receive end showing in block form details of the processor.

A DS1 stream is monitored at each end. FIG. 5 shows a single direction of DS1 traffic only. The other direction is symmetrical. Both DS1 directions are serviced by a single DDD circuit. FIG. 5A shows the transmit end and the timing. FIG. 5B shows the receive end. The DDD round trip delay measurement is carried out within the processor upon initial DDD connection as is known in the prior art, see FIG. 4 and see Bell System Technical Journal, November 1984, (AT&T End Office Connection Study). The DS1 data stream is monitored on a bridging basis, i.e., without disturbing the signal, and both clock and data are recovered. A synchronizing sample is captured and sent to the receiving end. At the end of capture the Processor starts sending CRC6 data computed over the block length and at the data rate selected, see Table above. The start of the first CRC block is defined by the end of the sync sample. At the same time, if a relatively long CRC block is used, and if it is desired to avoid resyncing in the case of marginally high DS1 rates, Sync Confirmation Bit Samples are captured and are added to the information which is transmitted over the DDD. This modifies the DDD thruput data requirements relative to the above table, adding sync confirmation bits to the per block data.

At the receive end the DS1 stream is also monitored. Some internal details of the Processor are shown in FIG. 5B. For purposes of explanation parallel processing of the received Sync, CRC, and Sync Confirmation Bit samples is shown. It should be understood that some of the operations may be serial. The recovered clock and data are delayed by an amount based on the measured round trip propogation delay of the DDD path, preferably one half the delay plus the selected window. At the same time the received synchronizing sample is assembled and is one input to a comparator. The received DS1 data is processed to generate a synchronizing sample in the same way that this was done at the transmit location. This continuosly updated synchronizing sample is compared with the DDD transmitted sample as stored in the Processor. At the instant of match synchronization is declared The CRC computation and the Sync Confirmation bit capture procedure is started. At the end of every CRC block, as clocked by the Processor, the computed CRC is compared with the stored CRC and the captured Confirmation bits are compared with the stored confirmation bits. If the sync capture point is valid the source of the stored CRC and capture bits is the same segment of the DS1 data stream at the transmit end as the segment from which the regenerated CRC and capture bits are computed at the receive end. If there art no errors or errors within the limits as defined previously in this description, then synchronization is confirmed and operation continues with CRC errors being computed block by block and sync being confirmed block by block. If sync is not confirmed or is subsequently lost after being confirmed, the transmit end is informed via the DDD and the synchronization process is restarted.

SYNCHRONIZATION STRATEGY 2

If the DS1 traffic described in synchronization strategy 1 is sufficiently repetitive several synchronizing attempts may be necessary. In a separate, also preferred embodiment having an alternative synchronization strategy, a less data-sensitive sync capture is provided. This second synchronization strategy is described in terms of a 1200 Bit/sec side channel data rate in order to illustrate the implications of a lower side channel data rate and hence a larger CRC check block size in terms of the operating problems encountered. A higher side channel data rate provides a simpler mechanization but makes greater demands on the side channel.

The second synchronization strategy compresses the data in the synchronizing sample in such a way as to minimize the amount of bit space occupied by repetitive information.

In addition a step may be added to the operating cycle called "confirmation". The sequence is thus:
1. Obtain a synchronization match.
2. Confirm synchronization (Confirmation CRC check) in such a way that a reasonable error rate for, example $10^{-4}$, in the basic DS1 stream will not prevent synchronization confirmation.
3. After confirmation switch to the "Normal CRC check" mode.
4. After confirmation sample a number of bits, for example four per CRC block, in the data stream. Select those same bits at the receive end. Compare the two sets and declare out of sync (and require resynchronization) when more than a cerrain number of these bits in a frame (for example 2 or more) are found to differ at each end of the circuit.

There is no possibility of a meaningful synchronization on a completely repetitive code such as "all ones" alarm however this is not a significant limitation because this alarm is not meaningful customer data. A completely random signal is synchronized with the least difficulty. At any given time there may be "Idle" channels in the PCM stream. Channel bytes are typically 8 bits in duration so that some form of 8 bit pattern may be generated which is repetitive by channel. Such "Idle" codes may take a variety of forms depending upon telco and customer practices. This embodiment of a synchronization strategy involves scanning the time window required while seeking a match between the side channel sample and the main channel sample. The number of bits in the synchronization sample is limited due to the disparity in data rate between the side channel and the main channel.

The presence of one or more idle channels as described below (out of the 24 channels in the DS1 stream), even in the presence of interspersed active channels and of framing information, is likely to result in multiple identical bit sequences within the comparison window. The second synchronization strategy circumvents this problem.

One form of idle code is "all ones" in the individual data channel (but not in all 24 channels and in the frame bit positions as in the case of the "all ones alarm" described above). Idle codes of this type are circumvented and the sample information compressed by using the number of clock periods between successive "0" to "1" transistions instead of the data itself as the basis of the synchronizing sample. DS1 protocol allows a maximum of 15 "0"s in sequence. Thus a four-bit nibble could be used. However, simulation runs show that differentiating between spacings of one to six, and considering all spacings of seven or more as "seven", provide an effective compression, provide nearly the same "synchronizing power", and occupy only a three-bit nibble of data.

Another common customer pattern, which may be encountered in one or more of the 24 channels in the DS1 stream, is the so-called "dotting" pattern. This comprises alternate "1"s and "0"s. The strategy of the previous paragraph is circumvented by such a signal. In order to prevent patterns of this type from occupying space in the synchronization pattern without contributing to synchronization information a further step is to accept only the first of a successive group of identical three-bit nibbles, i.e., transmit only the first such sample and discard the rest.

An individual customer choice of idle code is unrestricted. The following considerations lead to a third step in the synchronization algorithm. Assuming an eight bit customer byte, in 62.5% of the possible bit sequences there are two or more different 1/0 spacings. Thus if a repetitive 8-bit idle code contains non-repeating distances between 1/0 transitions, for example 11110010, then two or more nibbles will be consumed per byte of idle code. A further data compression is accomplished by discarding all but the first of successive identical pairs of samples which remain.

The data compression algorithm which results is as follows:
1. Measure (and encode) the distance between succesive 0/1 transitions. Construct a three-bit nibble which distinguishes measured intervals up to six and considers all intervals of seven or more as "seven".
2. In the case of successive identical nibbles discard all but the first one of the sequence.
3. In the case of succesive repeating pairs of nibbles discard all but the first pair.

This strategy calls for the capture of six more measurements than ultimately needed. After all measurements are captured, the first three and the last three are discarded. This insures that the pattern does not begin or end in the middle of a gap between 1/0 transistions, or with a partial two-nibble group repeat, and that it does not end with a partial two-nibble group repeat.

Generally speaking, the discarding of repeats and of group repeats will decrease the power of the 1/0 transistion strategy for random data, but will improve its power for data containing arbitrary byte sized idle codes. This is an appropriate tradeoff because the 1/0 strategy remains sufficiently powerful with random data patterns.

Other data compression schemes can be similarly developed. We have found that the above strategy, used with 10 3-bit samples as the synchronizing probe signal provides synchronization within one second in virtually all cases of normal DS1 traffic using a nominally 50 millisecond window.

Basic Synchronization

DS1 data at the transmitting end is processed to capture a synchronization sample (e.g., 10 3-bit samples using the above strategy).

For DS1 data patterns which have multiple "nearly identical" cycles within the synchronization window it is possible to further improve the efficiency of the sync search process by pre-testing the sync data sample at the transmitting end to make sure that it is not a multiply repeated pattern before allowing its use at the receiving end.

Figure 6A:
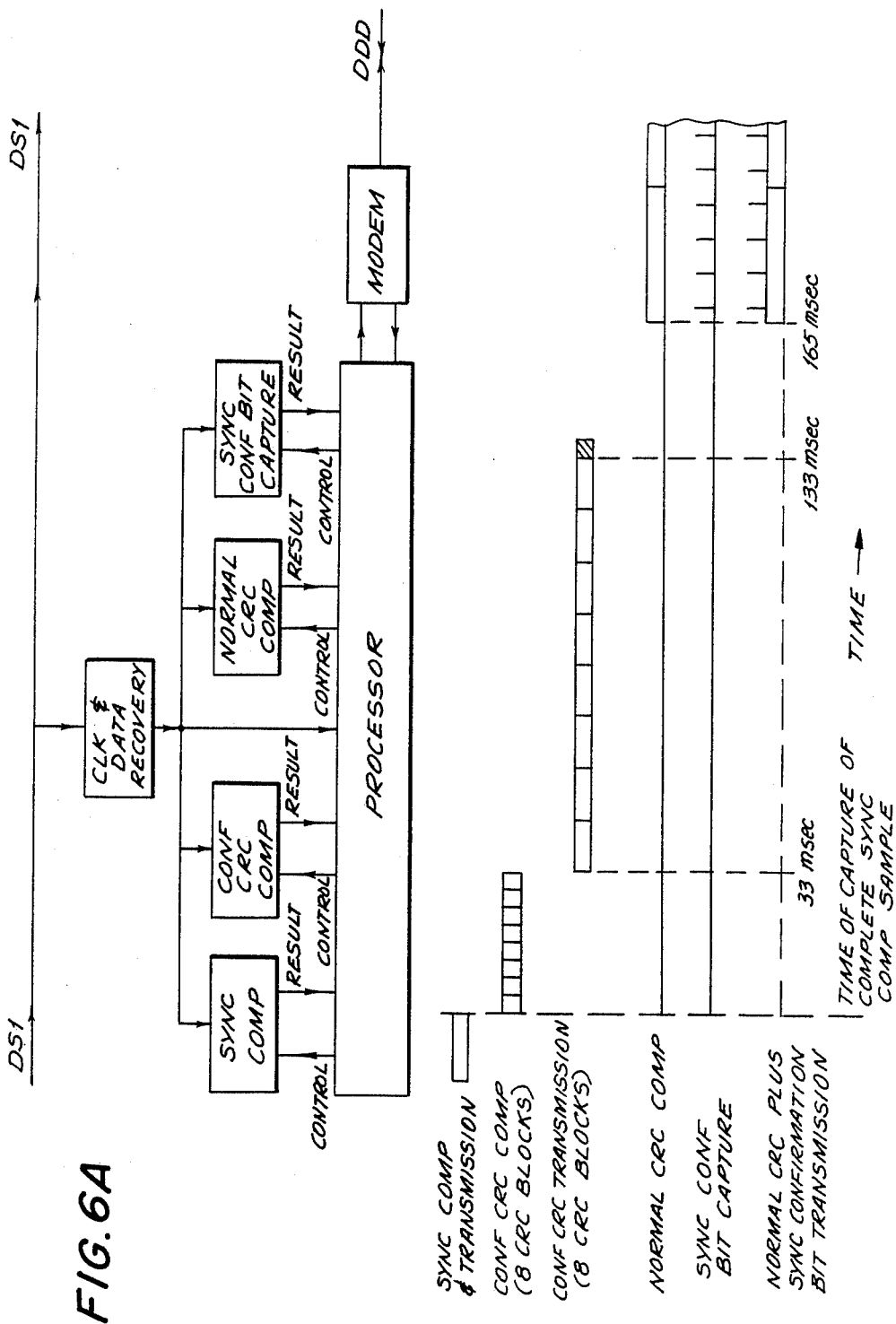
FIG. 6A is a block diagram of the receive end showing the sequence of events subsequent to sync capture in an alternative embodiment of the invention.
Figure 6B:
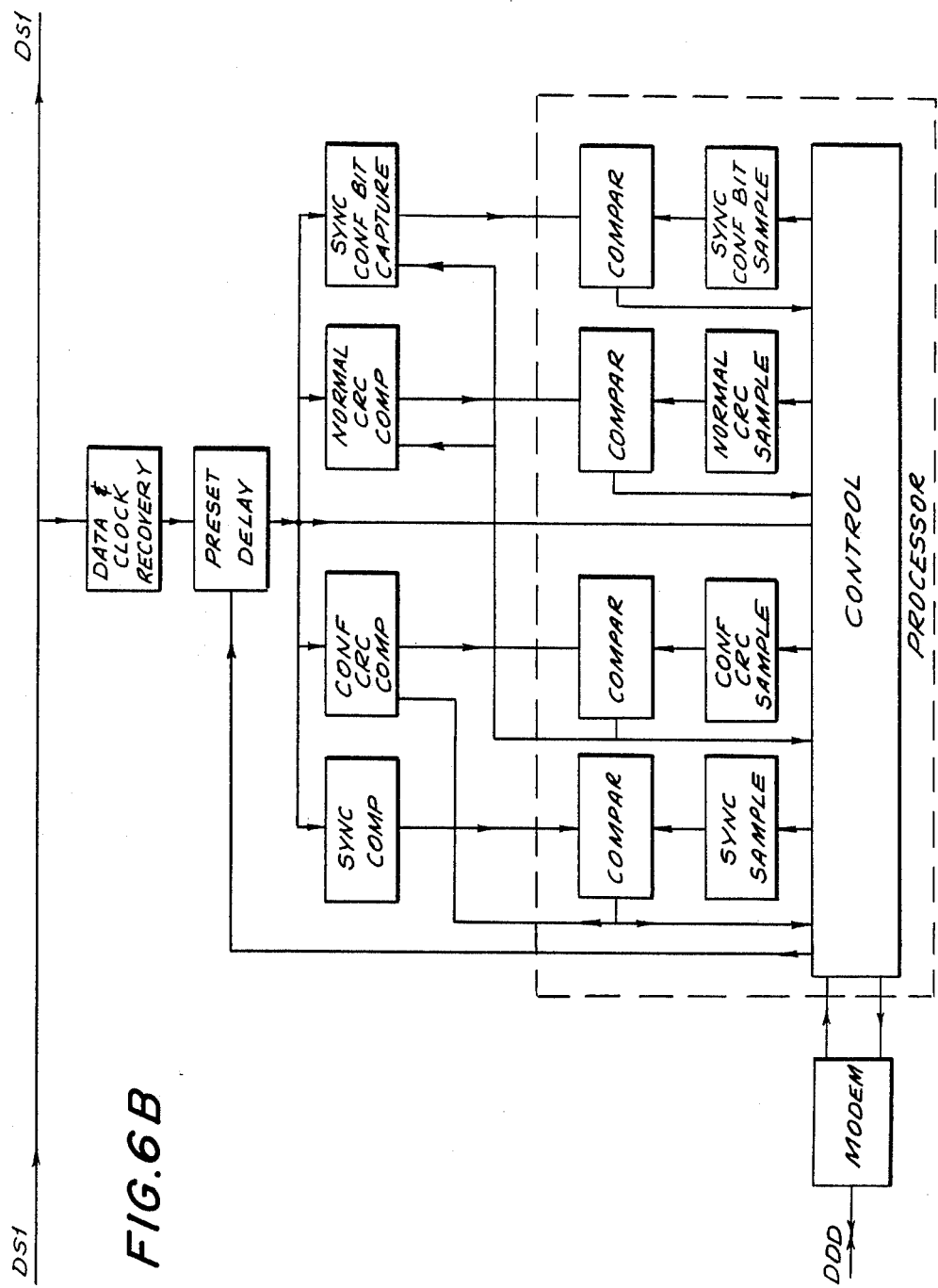
FIG. 6B is a diagram of the receive end showing in block form details of the processor in an alternative embodiment of the invention.

FIG. 6A shows the sequence of events subsequent to sync capture at the transmitting end. As soon as the sync sample is captured, three activities begin:
1. Optionally the testing of the sync sample to insure that it does not repeat in the next window of time begins.
2. The computation of the confirmation CRC begins.
3. The transmission of the sync sample to the receiving end begins.

At the receiving end activities begin as soon as a complete sync sample is received over the DDD side channel. The fixed delay applied to the receiving end DS1 signal (Preset Delay) ensures that the beginning of the sync window is later than receipt of a complete sync sample via the DDD link.

CRC Sync Confirmation

Each time a sync sample match occurs at the receiving end (up to a window period from the start of search) the CRC check circuitry is reset and a new CRC computation is begun. A clock is also reset so that it is possible to time out a DS1 data block which is the same length as that used at the transmitting end to compute confirmation CRC.

An objective is to confirm sync with a high degree of certainty even in the presence of a bit error rate of 1 error per 10,000 bit positions of the DS1 data. It will be assumed that initial synchronization need not be guaranteed at DS1 error rates exceeding 1 error in 10,000 bits.

In the normal CRC check, see below, it is contemplated that a nominally 51 kB error block will be used. This provides sufficient bit capacity in the side channel relative to the DS1 stream such that more than enough CRC, control, and DDD error detecting, and system error reporting capacity is available. The CRC block width is of the order of 33 msec. It is desireable to confirm sync by comparing 33 msec. of data at the receiving end with 33 msec. of data at the transmitting end. Since there are approximately 51,000 bits of DSI data there are an expected 5.1 bit errors within the window when a 1/10,000 error mechanism is present. Thus in order to meet its objectives, the unit must be able to ignore up to 1 error per 10,000 bits of data occuring during the confirmation check but flag higher rates of errors as a "mis-sync" condition.

Furthermore, the error checking mechanism will not be perfect. For example, the CRC-6 mechanism detects at least 63/64 of all possible error patterns. This means that a block of data checked as a result of a "mis-sync" condition has a small chance of being declared good even though it does not match the pattern of the transmitting end DS1 data from which the CRC-6 symbol was computed.

During confirmation it is therefore preferable to ignore some number of blocks indicated as errored in order to permit the presence of random bit errors and it is preferable to ignore some number of "good" blocks which result from the imperfectness of the CRC check. One way to achieve this is to break the 51 KB block into smaller blocks for which:
1. The number of blocks expected to be errored due to random bit errors at the maximum specified rate is less than the total number of blocks.
2. The number of blocks expected to be errored due to a "mis-sync" condition is large.

Then a decision is made that for less than X errored blocks the system is assumed to be in sync and for more than Y errored blocks the system is assumed to be mis-synced. ($X <= Y$).

The proper block length is determined from the statistics of errored blocks. The probability that no more than X blocks are errored due to random bit errors and the probability that at least Y blocks are errored during "mis-sync" are indicated below, the table shows p(X)/p(Y) for various block lengths and various % of the total number of blocks, for CRC-6. In each case the number of blocks multiplied by the block length equals 64K ($K = 1024$).

| Block Length | No. of Blocks | % of Blocks | | | |
|---|---|---|---|---|---|
| | | 25 | 50 | 75 | 100 |
| 1K | 64 | 1.0/1.0 | 1.0/1.0 | 1.0/1.0 | 1.0/.36 |
| 2K | 32 | .88/1.0 | 1.0/1.0 | 1.0/1.0 | 1.0/.60 |
| 4K | 16 | .33/1.0 | .95/1.0 | 1.0/1.0 | 1.0/.78 |
| 8K | 8 | .08/1.0 | .50/1.0 | .93/1.0 | 1.0/.88 |
| 16K | 4 | .03/1.0 | .17/1.0 | .57/1.0 | 1.0/.94 |
| 32K | 2 | — | .07/1.0 | — | 1.0/.97 |

Thus, for example, at a $10^{-4}$ error rate with CRC-6 there is a 7% chance that more than six out of eight (75%) 8K blocks will be errored due to a random 1/10,000 bit ( error rate and a negligible chance that less than six out of eight 8K blocks will be errored due to "mis-sync". If in spite of the low odds a false sync is confirmed there will shortly follow an out of sync indication from the out-of-sync detection scheme.

"Confirmation CRC" Data Rate

The number of bits of CRC information which must be sent over the side channel to confirm sync is equal to the number of blocks times the number of CRC bits per block. Confirmation CRC can be on a sampling basis because error reporting does not start until sync is captured and confirmed. After sync is captured "Confirmation CRC" checking starts. Synchronization is confirmed by a subsequent CRC error threshold below an acceptable threshold. Each time a sync sample match occurs at the receiving end (up to a window period from the start of search) the CRC check circuitry is reset and a new CRC computation begun. The clock is also reset so that it is possible to time a DS1 data block which is the same length as that used at the transmitting end to compute confirmation CRC. Assume 16 data bits and 6 check bits in a message which is transmitted in three 8 bit bytes plus a start and stop bit per byte. At a data rate of 1200 B/sec transmission of CRC6 for eight nominally 6 Kb blocks occupies 100 milliseconds. Referring to FIG. 6A, at the transmit end the synchronizing sample is transmitted. The next 33 msec. is broken up into 8 nominally 6 kB samples during which eight six bit CRC computations are carried out and stored. This is the confirmation sample. The block length (in bits) for the short blocks is chosen to be a prime number near the value (0.033sec $\times$ 1544000 bit/sec)/8. This is (Sample time $\times$ DS1 data rate)/number of samples. A prime number is chosen to minimize the effect of cyclic or periodic samples. After confirmation is complete "Normal Operation" CRC6 is calculated for 33 msec block lengths. The 8 short blocks are for Confirmation CRC, the subsequent 33 msec blocks are for Normal CRC. The information transmission sequence is first the synchronizing sample, then the Confirmation CRC sample, then the Normal Operation CRC. The Normal Operation CRC continues until a signal back requesting re-sync.

At the receive end the synchronizing signal for the DS1 stream is computed continuously and assembled in a parallel readout shift register where it is serially updated by the computed synchronizing signal. Upon detecting match the same sequence of Confirmation CRC and Normal CRC are computed for comparison with the same data received via the side channel. A gap is provided after transmission of the 100 msec burst of confirmation CRC to account for timing variation in the asynchronous channel. The Normal CRC check is resumed with the first complete CRC block thereafter.

Neither the synchronization nor the Sync Confirmation need be done in real time. After the sync is achieved and confirmed however if the ongoing "Normal CRC" checking for transmission errors is not done in real time all of the DS1 data can not be checked. This means that the CRC check block length should be long enough to permit the side channel to transmit all data required for serviceing a block during a one block interval. This includes CRC, error reporting, status reporting, and overhead.

Functional Description, Sync Strategy 2

The difference between FIG. 5A and FIG. 6A is the addition of a CRC based sync confirmation. Immediately after sync capture, a series of eight short block CRC samples are calculated. These blocks are ⅛ of the eventual normal CRC block duration. The eight CRC6 digits are assembled and transmitted over the interval from 33 to 133 msec. After sync match is detected at the receive end the same 33/8 msec blocks are computed and are compared with the side channel transmitted CRC6. If six out the eight blocks have no CRC error synchronization is confirmed.

The receive hardware selects the start of the next CRC sample interval after the end of the confirmation check transmission blocks and starts normal CRC check plus sync confirmation bit check.

SYNCHRONIZATION STRATEGY 2 IMPLEMENTATION

1/0 Transition Distance Measurement

Figure 7:
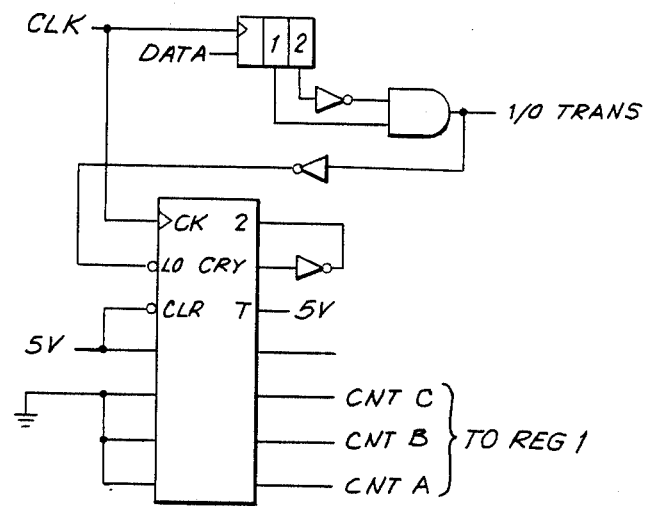
FIG. 7 is a logic diagram for measuring the distance between successive 1/0 transitions.

FIG. 7 shows the logic for one possible implementation of the function of measuring the distance between successive 1/0 transitions.

Unipolar data is clocked into a shift register. The shift register must be at least two bits long.

On each positive going clock transition two successive bits are inspected. If the first bit is a 0 the second bit is a 1 the signal "1/0 TRANS" will be asserted.

A four bit counter is used to measure the distance between 1/0 transitions. The counter is preset to 8. On each clock transition for which the signal "1/0 TRANS" is false, the counter will increment. The count sequence is 8 to 15. Should the counter reach 15 a carry is generated which, by virtue of its being inverted and fed back to the clock enable input, causes the count to be limited to 15 with no roll-over.

When a 1/0 transition occurs a low is applied to the synchronous load input to the counter so that on the next clock transition the counter is preset to 8 and the process begins again.

Except for the very first count sequence (which will be ignored) the occurrence of a 1/0 transition causes the counter to be preset to 8. The next clock transition after the preset load causes the 1 of the 1/0 pair to shift to the second bit position so that a 1/0 transition is not possible at that time. Because of this a distance measurement of 0 is impossible. This fact is useful in implementing the group repeat suppression logic.

Only the three low order bits of the counter are used. As a result, the count sequence of 8 to 15 becomes 0 to 7 for use as the distance measurement.

The distance measurement will be shifted into a three bit register (REG 1) on the leading edge of "CLKD 1/0 TRANS".

Figure 8:
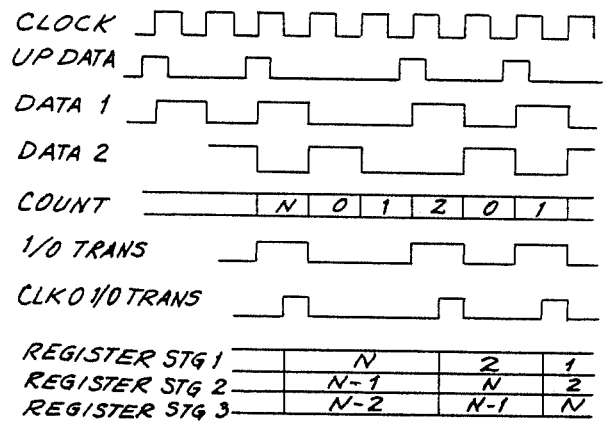
FIG. 8 is a timing diagram of a signal.

FIG. 8 shows the timing of major signal relevant to FIG. 1.

Figure 9:
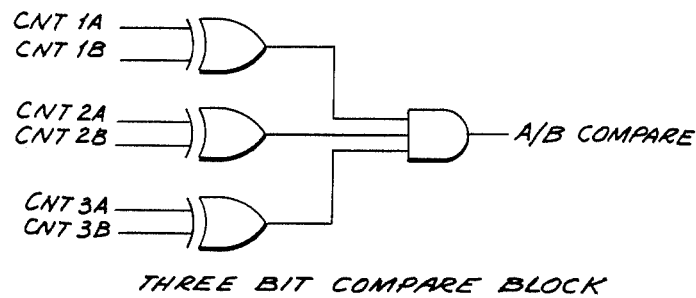
FIG. 9 depicts the comparator logic for comparing two three-bit quantities.

FIG. 9 shows the logic which can be used to compare two 3-bit quantities. This logic is shown in block diagrams as COMP.

Figure 10:
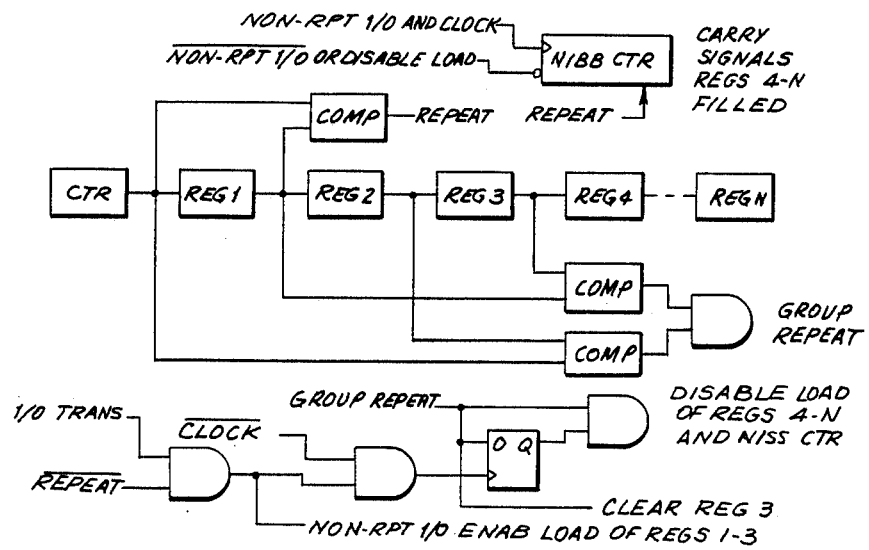
FIG. 10 is a diagram of a portion of the logic required to capture the sync data and suppress the captime of repeating three-bit quantities.

FIG. 10 is a diagram of a portion of the logic required to capture the sync data, including logic to supress repeat counts, logic to supress group repeats and logic to indicate when a full sync data sample has been captured.

The CTR block represents the logic of FIG. 7.

REG 1 through REG N are three bit registers with load enable inputs, clock inputs and, in some cases, clear The input data and output data of REG 1 are continuously compared. If the two sets of data are the same, REPEAT will be true to indicate that the shift of data ( CTR →REG 1→REG 2→REG 3) should be supressed. This is the method by which repeat counts are suppressed.

The clock input for REG 1 to REG 3 is the high-to-low transition of CLOCK. The load enable input for REG 1 to REG 3 is 1/0 TRANS "anded" with inverted REPEAT.

The input data to REG 1 is compared to the input data of REG 3. The input data to REG 2 is compared to the input data of REG 4. If both comparisons are true, a group repeat exists and the signal GROUP REPEAT is asserted. When a group repeat occurs it is desired to discard one of the repeating pairs of measurements and not perform the group repeat test again until two additional distance measurements have been shifted into REG 1-3.

In the absence of a group repeat and in the absence of a single repeat data would normally shift, on each 1/0 transition, from CTR to REG 1, from REG 1, to REG 2, . . . ,REG N−1 to REG N. When a single repeat occurs all shifts are inhibited.

Discarding a repeating pair of measurements is accomplished by disabling the next two shifts of data into REG 4 and all higher registers. The D register is clocked on each non-repeating 1/0 transition. It stores GROUP REPEAT for one such clock period. By Oring the D register's input and output a signal is generated which can be used to skip the shift of data into REG 4 to REG N for two non-repeating 1/0 transitions.

The presence of GROUP REPEAT also causes REG 3 to be cleared on the next non-repeating 1/0 transition. Since 0 is never shifted as an actual distance value no group repeat can be detected until at least the next non-repeating 1/0 transition.

FIG. 11 shows the timing of signals associated with the suppression of repeating 1/0 transition distance measurements.

FIG. 12 shows the timing of signals associated with the suppression of repeating pairs of 1/0 transition distance measurements.

Only the distance measurements in REG 4 through REG N are ultimately used as sync data. This prevents the possibility of having partially formed measurements included in the sync data.

The counter NIBB CTR is preset to produce a carry when REG 4 through REG N are all filled with proper distance measurements. The counter increments each time distance values are shifted up from REG 4 to REG 5, REG 5 to REG 6, . . . ,REG N−1 to REG N. The preset value is chosen to discard 3 measurements by shifting them out of REG N. This is done to discard the very first, possibly incomplete, measurement and to discard the two measurements which might result from entering a group repeat sequence at a point which would yield an improperly formed pair. (For example, if the sequence abababc is entered with an "a", the sequence reduces to abc. If the same sequence is entered with a "b", the sequence reduces to babc. Discarding the first two measurements gives c in the first case and bc in the second case, either of which is correct.

Synchronization Comparison Logic

FIG. 13 shows the logic required for each 3-bit distance measurement in the final sync sample. REG A can be used, by proper selection of the multiplexor, to store either data samples from REG 4 or data samples from an external source.

When a complete sync sample has been captured (NIBB CTR CARRY =1) at the transmitting end the 3-bit sample in REG 4 is transferred to REG A. The 3-bit sample is thereby made available for inspection at the "DATA OUT" port and is simultaneuosly made available for comparison with newly generated data samples. At the transmitting end, when data in REG 4 matches data in REG A, and the same is true for all other register pairs in the sync sample, SYNC is asserted.

At the transmitting end the sequence of operations is as follows:
1. Capture a complete sync sample (NIBB CTR CARRY =1).
2. Transfer the complete sync sample to REG A, REG B . . .
3. Begin computing CRC on the DS1 data when NIBB CTR CARRY goes from 0 to 1.
4. Begin sending the complete sync sample to the receiving end.
5. Thereafter send eight blocks of CRC6 data for a nominal block length of 6 k/b.

6. Thereafter switch to CRC6 data for a nominal block length of 51 k/b. The excess capacity is used for error control checking and for transferring maintenance information from end to end. During this time also monitor Sync Confirmation Bits at fixed positions in the CRC block at each end of the circuit. Transmit the entry sample to the exit (receive) location and compare. Declare out of sync in the presence of a high CRC error rate and of a specifed error rate and error duration in the sync confirmation bits.

At the receive end the same sequence is carried out except that the computational results are continuously stepped along the shift registers while a sync match is sought. The instant of match establishes end to end sync. This point is subject to subsequent confirmation by CRC checking.

If CRC6 confirmation is not achieved in 5. (at least 6 out of 8 error free blocks), or if out of sync is subsequently declared during 6, the receiving end signals the transmitting end to start the sync sequence again.

We claim:

1. A method for determining end to end reliability performance of high speed digital data channels having two originating ends comprising:
    (a) establishing for at least one direction end to end synchronization by use of data transmitted by a side channel
    (b) confirming the validity of the synchronization
    (c) calculating and transmitting over the side claimed data including CRC data from an originating end
    (d) performing a comparison of the data and CRC data
    (e) from time to time reconfirming the validity of the synchronization.

2. A method for determining reliablity performance of a high speed data chennel adapted to transmit data between at least two ends comprising a transmitting end and a receiving end, said method comprising:
    (a) establishing, by use of data transmitted over a side channel between said two ends, the time synchronization of data transmitted from said transmitting end and data received at said receiving end
    (b) confirming the validity of the synchronization
    (c) calculating and transmitting over a side channel data representative of a portion of the data in the high speed channel
    (d) performing a comparison of said portion of the data in the high speed channel and said data transmitted over said side channel
    (e) from time to time reconfirming the validity of the synchronization.

3. The method of claim 1 or 2 wherein the step of establishing synchronization comprises monitoring, transmitting and comparing selected bits within a CRC block.

4. The method of claim 1 or 2 wherein said step of confirming synchronization comprises sampling synchronization confirmation bits at distinct locations in a CRC block, said synchronization confirmation bits being first transmitted by said side channel for comparison with bits received on said high speed digital data channel.

5. The method of claim 4 wherein said step of confirming synchronization comprises compressing the data in said synchronization sample.

6. The method of claim 5 wherein said compression step comprises sampling a pre-determined number of bits in the data stream of the high speed and side channels, comparing said pre-determined number of bits and declaring out of sync if said comparison fails for more than a second predetermined number of bits.

7. The method of claim 5 wherein the step of compressing the data in said synchronization sample comprises encoding the distance between successive 0/1 transitions, and constructing a nibble encoded to distinguish up to a pre-determined interval size.

8. The method according to claim 7 wherein more than one such nibble is constructed and successive identical nibbles are discarded.

9. The method of claim 8 wherein repeating pairs of nibbles are discarded.

10. The method according to claim 7 wherein a plurality of first and last measurements discarded.

11. The method of claim 5 wherein said step of compressing the data in said synchronization sample comprises deleting repeating bit patterns of a pre-determined size.

12. The method of claim 2 wherein said step of confirming synchronization comprises a CRC based synchronous confirmation step wherein after establishing synchronization a predetermined group of CRC block samples are calculated and synchronization is confirmed if a second predetermined number of said block samples is confirmed.

13. The method according to claim 1 or 2 wherein the step of confirming the validity of synchronization comprises selecting a window of predetermined size and eliminating synchronous data patterns that occur repeatedly within said window.

14. The method of claim 1 or 2 wherein the step of confirming the validity of synchronization comprises performing a CRC computation.

15. The method of claim 1 or 2 further comprising the steps of delaying the receipt of an image of the received high speed data signal.

16. The method of claim 15 wherein said delay is accomplished by writing and reading from a ring buffer.

17. The method of claim 1 or 2 wherein errors in the side channel are detected and deleted from attribution to the high speed channel under test.

18. The method of claim 15 wherein a time interval window is selected to allow sufficient sample to establish and confirm synchronization.

19. The method of claim 18 wherein the size of said time interval window is based upon a round trip delay measured on a side channel.

20. The method of claim 15 wherein said delay comprises satellite delay and unpredictable delay, the method further comprising calibrating out said satellite delay and selecting a sample window size sufficient to establish and confirm synchronization.

* * * * *

UNITED STATES PATENT AND TRADEMARK OFFICE
CERTIFICATE OF CORRECTION

PATENT NO.  : 4,736,377
DATED       : April 5, 1988
INVENTOR(S) : Frank Bradley and Royce Fletcher It is certified that error appears in the above-identified patent and that said Letters Patent is hereby corrected as shown below:

At column 19, line 30.

The phrase "transmitting over the side claimed" should read, "transmitting over the side channel".

Signed and Sealed this

Third Day of July, 1990

*Attest:*

HARRY F. MANBECK, JR.

*Attesting Officer*             *Commissioner of Patents and Trademarks*